United States Patent
Brioschi et al.

(10) Patent No.: US 12,547,231 B2
(45) Date of Patent: Feb. 10, 2026

(54) INFORMATION COMMUNICATION SYSTEM WITH INFORMATION AGGREGATOR FOR UNINTERRUPTABLE POWER SUPPLY

(71) Applicant: ABB Schweiz AG, Baden (CH)

(72) Inventors: Massimiliano Brioschi, Locarno (CH); Oscar Apeldoorn, Lengnau (CH)

(73) Assignee: ABB Schweiz AG, Baden (CH)

( * ) Notice: Subject to any disclaimer, the term of this patent is extended or adjusted under 35 U.S.C. 154(b) by 63 days.

(21) Appl. No.: 18/354,955

(22) Filed: Jul. 19, 2023

(65) Prior Publication Data
US 2024/0028097 A1 Jan. 25, 2024

(30) Foreign Application Priority Data
Jul. 20, 2022 (EP) ..................................... 22185942

(51) Int. Cl.
*G06F 1/28* (2006.01)
(52) U.S. Cl.
CPC ..................................... *G06F 1/28* (2013.01)
(58) Field of Classification Search
CPC ... G06F 1/28; G06F 1/30; G06F 1/305; G06F 1/32; G06F 1/3203; G06F 1/3206; G06F 1/3209
See application file for complete search history.

(56) References Cited

U.S. PATENT DOCUMENTS

| | | | | |
|---|---|---|---|---|
| 6,274,950 B1* | 8/2001 | Gottlieb | ............. | G01R 31/3648 307/66 |
| 2004/0119736 A1* | 6/2004 | Chen | ..................... | H04L 67/025 715/736 |
| 2004/0164712 A1* | 8/2004 | Lin | ..................... | G01R 31/3648 320/136 |
| 2006/0206741 A1* | 9/2006 | Allison | ................... | G06F 1/266 713/340 |

(Continued)

FOREIGN PATENT DOCUMENTS

| CN | 104520724 B | 2/2018 | | |
|---|---|---|---|---|
| EP | 2587725 A1 * | 5/2013 | ......... | H04L 41/0226 |
| WO | WO-2017027041 A1 * | 2/2017 | ................ | H02J 9/06 |

OTHER PUBLICATIONS

European Patent Office, Extended European Search Report in European Patent Application No. 22185942.4, 8 pp. (Jan. 17, 2023).

*Primary Examiner* — Raymond N Phan
(74) *Attorney, Agent, or Firm* — Fitch Even Tabin & Flannery LLP (57) ABSTRACT

An information communication system includes a communication network configured to exchange uninterruptable power supply, UPS, information; a UPS connected to the communication network and configured to exchange UPS information to the communication network; an information collector configured to collect and process the UPS information; wherein the information collector has no direct access to the UPS information; wherein the information communication system comprises an information aggregator (Continued)

connected to the communication network and configured to poll the UPS information from the UPS; generate collector information using the polled UPS information; and send the collector information to the information collector.

13 Claims, 5 Drawing Sheets

(56) References Cited

U.S. PATENT DOCUMENTS

| | | | |
|---|---|---|---|
| 2008/0244283 A1* | 10/2008 | Elliott | G06F 1/305 713/300 |
| 2015/0180920 A1 | 6/2015 | Hunter | |
| 2020/0235607 A1* | 7/2020 | Kanarellis | H04L 41/0661 |

* cited by examiner

INFORMATION COMMUNICATION SYSTEM WITH INFORMATION AGGREGATOR FOR UNINTERRUPTABLE POWER SUPPLY

CROSS-REFERENCE TO RELATED APPLICATIONS

The instant application claims priority to European Patent Application No. 22185942.4, filed Jul. 20, 2022, which is incorporated herein in its entirety by reference.

FIELD OF THE DISCLOSURE

The present disclosure generally relates to an uninterruptable power supply, UPS, information communication system and a corresponding information communication method.

BACKGROUND OF THE INVENTION

In industrial environments, uninterruptable power supplies, UPS, are frequently used to provide safety against loss of power. Generally, the UPS are monitored by external devices, so called information collectors, that collect UPS information, which comprise status information of the UPS, and process the respective UPS information. This includes for example monitoring a maintenance status or loading states of the UPS. However, often UPS of different manufacturers are used in the industrial environment. Usually, an information collector of a first is only able to collect and process UPS information from its own UPS. Thus, the information collector of the first is not able to include the UPS of other manufacturers, which limits the functional possibilities of the information collector.

BRIEF SUMMARY OF THE INVENTION

In view of the foregoing, there is a need for an improved UPS information communication system that allows an information collector of a first to collect and process UPS information of all UPS in the information communication system independent from their manufacturer.

According to an aspect of the disclosure, an information communication system comprises: A communication network, configured to exchange uninterruptable power supply, UPS, information. A UPS, connected to the communication network, wherein the UPS is configured to exchange UPS information to the communication network. An information collector, wherein the information collector is configured to collect and process the UPS information. The information collector has no direct access to the UPS information. The information communication system comprises an information aggregator that is connected to the communication network and is configured to poll the UPS information from the UPS, to generate collector information using the polled UPS information and to send the collector information to the information collector.

In other words, the UPS provides UPS information to the information collector over the communication network with the help of the information aggregator.

The term "polling", as used herein, relates to a procedure by which a device, in this case the information aggregator accesses a network, in this case the internal network, calls another device, in this case the UPS, and downloads information, in this case the UPS information, stored in the device. In other words, polling comprises a request, in particular a cyclic request, for information.

The term "direct access", as used herein, comprises the information collector not having access rights to the UPS, the information collector not knowing how to poll the UPS information from the UPS, the UPS is not sending information to the information collector, and/or the information collector not being able to interpret the UPS information polled from the UPS, in particular the UPS information not being in a format that is processable by the information collector.

For example, the UPS is of another brand as the information collector leading to the information collector not having direct access to the UPS.

The term "information", as used herein, is also referred to as "data".

For example, the UPS information is provided by the UPS in form of a ZIP file.

The information aggregator is not a gateway between the UPS and the connection to the information collector. It is rather an active device added to the communication network of UPSs, addressing UPSs autonomously and sending out the information to the information collector. The information aggregator can determine the collector information, in other words, when a UPS is not reachable anymore in the local network, or when it gets rebooted, polling statistics based on the polled UPS information. The collector information is communicated to the information collector. The collector information is not collected from any other device in the network.

The term "information collector", as used herein, relates to a means, in particular a device, that is configured to receive and to evaluate or store or transfer information, in particular the collector information and/or the UPS information of the UPSs.

DETAILED DESCRIPTION OF THE INVENTION

The reference symbols used in the drawings, and their meanings, are listed in summary form in the list of reference symbols. In principle, identical assembly parts are provided with the same reference symbols in the figures.

Preferably, the functional modules and/or the configuration mechanisms are implemented as programmed software modules or procedures, respectively; however, one skilled in the art will understand that the functional modules and/or the configuration mechanisms can be implemented fully or assembly partially in hardware.

Figure 1:
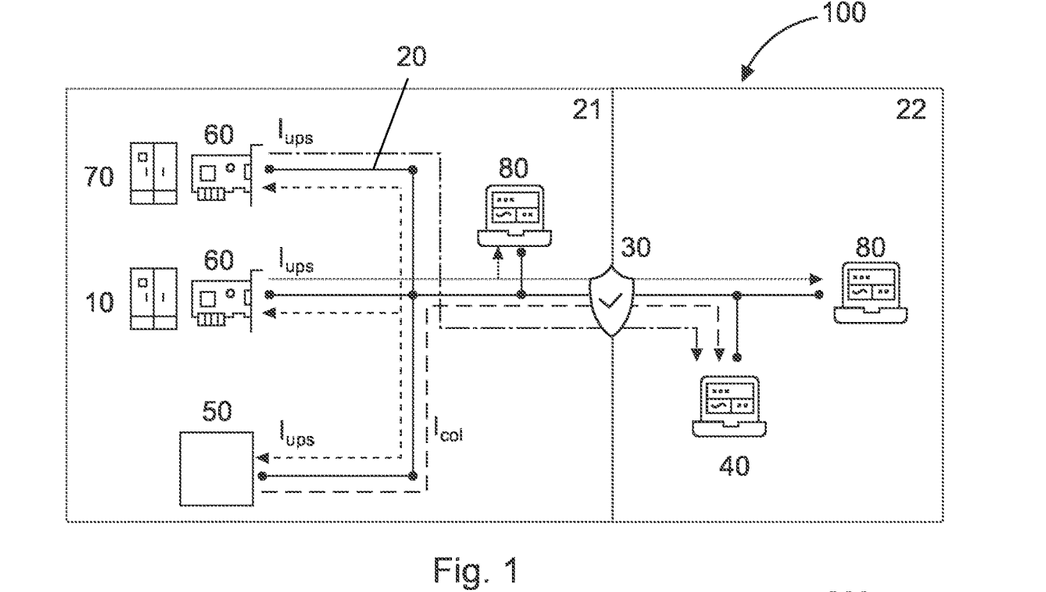
FIG. 1 shows a schematic view of an information communication system according to a first embodiment.

FIG. 1 shows a schematic view of an information communication system 100 according to a first embodiment. The information communication system 100 comprises a plurality of UPSs 10, 70, which are configured to provide UPS information to a communication network 20. The information communication system 100 further comprises a plurality of information collectors 40, 80, which are configured to collect the UPS information of the plurality of UPSs. The plurality of information collectors 40, 80 comprises a second information collector 40 and two first information collectors 80. The plurality of UPSs 10, 70 comprises a first UPS 10 and a second UPS 70. The first UPS 10 and the second UPS 70 each are connected to the communication network 20 via a network adapter 60, which is preferably plugged into the respective UPS 10, 70 and is configured to connect the UPS 10, 70 with the communication network 20. The second information collector 40 has direct access to the second UPS 70 and as such can request and receive UPS information of the second UPS 70. The second information collector 40 can also receive UPS information autonomously send by the UPS 70. The second information collector 40 has not direct access to the first UPS 10. Having no direct access comprises the second information collector 40 not having access rights to the first UPS 10, the second information collector 40 not knowing how to poll, or in other words request, the UPS information from the first UPS 10, the second information collector 40 not being able to receive or interpret information from the UPS 10 and/or the second information collector 40 not being able to interpret the UPS information polled from the first UPS 10, in particular the UPS information not being in a format that is processable by the second information collector 40. Thus, the second information collector 40 is not able to provide monitoring functionalities on the entirety of the UPSs 10, 70 in the information communication system 100.

The first information collectors 80 have no or not always have direct access to the second UPS 70 but have direct access to the first UPS 10.

The communication network 20 comprises a local area network, LAN, 21 and a wide area network, WAN, 22. The LAN is a collection of devices connected together in one physical location, such as a building, office, or home. A LAN can be small or large, ranging from a home network with one user to an enterprise network with thousands of users and devices in an office. The WAN is a large network of information that is not tied to a single location. WAN are a form of telecommunication networks that can connect devices from multiple locations and across the globe.

In this case, the first UPS 10, the second UPS 70 and one of the first information collectors 80 are connected to the LAN 21, while the second information collector 40 and the other first information collector 80 are connected to the WAN 22. The information communication system 100 further comprises an information collector interface 30, connecting the LAN 21 and the WAN 22. The information collector interface 30 is configured to exchange information between entities connected to the LAN 21 and entities connected to the WAN 22. The information collector interface 30 preferably comprises a network security system. The network security system comprises of both hardware and software to secure the underlying networking infrastructure from unauthorized alteration, malfunction, misapplication, and inappropriate disclosure. This provides a secure platform for devices connected to the communication network 20 and for the users to perform their respective functions within a secure environment.

The connections between the different entities within the LAN and/or the WAN may be wired or wireless. As described, the second information collector 40 is not able to access UPS information $I_{ups}$ from the first UPS 10.

The information communication system 100 comprises an information aggregator 50 that is connected to the LAN 21 and is configured to poll the UPS information $I_{ups}$ from the first UPS 10. The information aggregator 50 is provided with specific polling protocols that allow polling the UPS information $I_{ups}$ from the first UPS 10.

The information aggregator 50 is further configured to determine collector information $I_{col}$ based on the polled UPS information $I_{ups}$. The collector information $I_{col}$ comprise at least part of the polled UPS information $I_{ups}$. The collector information $I_{col}$ for example have an information format that is readable and processable by the second information collector 40.

The information aggregator 50 is further configured to provide the collector information $I_{col}$ to the second information collector 40. Thus, the second information collector 40 can be supplied with status information of the first UPS 10 and the second UPS 70. In other words, the second information collector 40 can provide additional functionalities, for example monitoring functionalities, based on the UPS information of all UPSs of the information communication system 100.

Of course, although most of the time not necessary, the information aggregator 50 is also configured to poll UPS information $I_{ups}$ from the second UPS 70.

Figure 2:
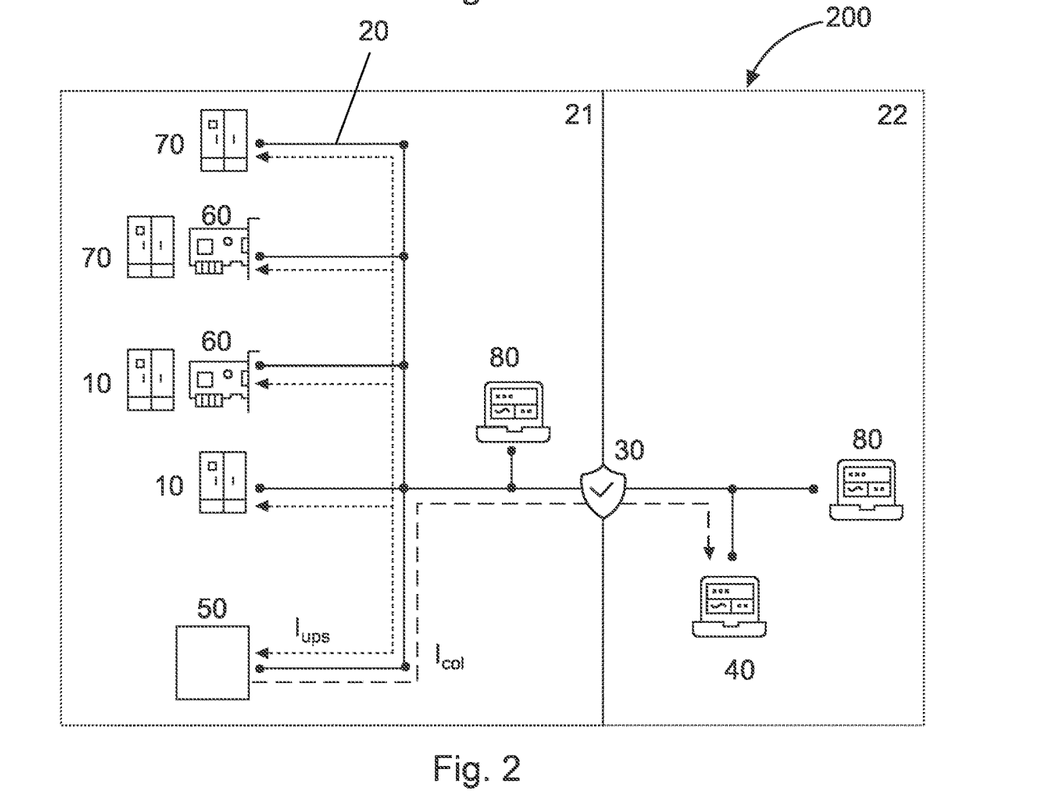
FIG. 2 shows a schematic view of an information communication system according to a second embodiment.

FIG. 2 shows a schematic view of an information communication system 200 according to a second embodiment. Compared to the information communication system 100 of FIG. 1, the information communication system 200 comprises two first UPSs 10 and two second UPSs 70. FIG. 2 illustrates that the connection between the UPSs 10, 70 and the LAN is not necessarily provided by a plug-in network adapter 60. The functionality of the network adapter might also be integrated, or in other words hard wired, into the respective UPS 10, 70. In other words, a UPS 10, 70 can also be connected to the LAN by integrating the functionalities of a network adapter 60 into its own internal control board.

Figure 3:
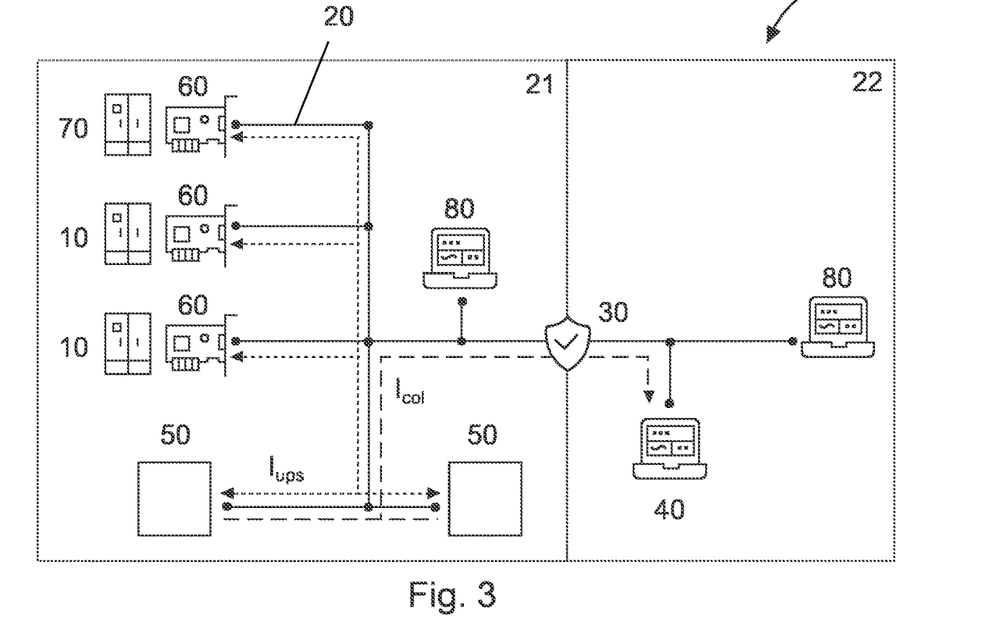
FIG. 3 shows a schematic view of an information communication system according to a third embodiment.

FIG. 3 shows a schematic view of an information communication system 300 according to a third embodiment. Compared to the information communication system 100 of FIG. 1, the information communication system 300 comprises two information aggregators 50.

The information aggregators 50 allow implementing balancing and/or redundancy functions. For example, the information aggregators 50 divide the polling of the UPS information $I_{ups}$ of the different UPSs 10, 70. Alternatively, the information aggregators 50 both poll UPS information $I_{ups}$ from each UPS 10, 70 to provide a redundancy of the UPS information $I_{ups}$.

Figure 4:
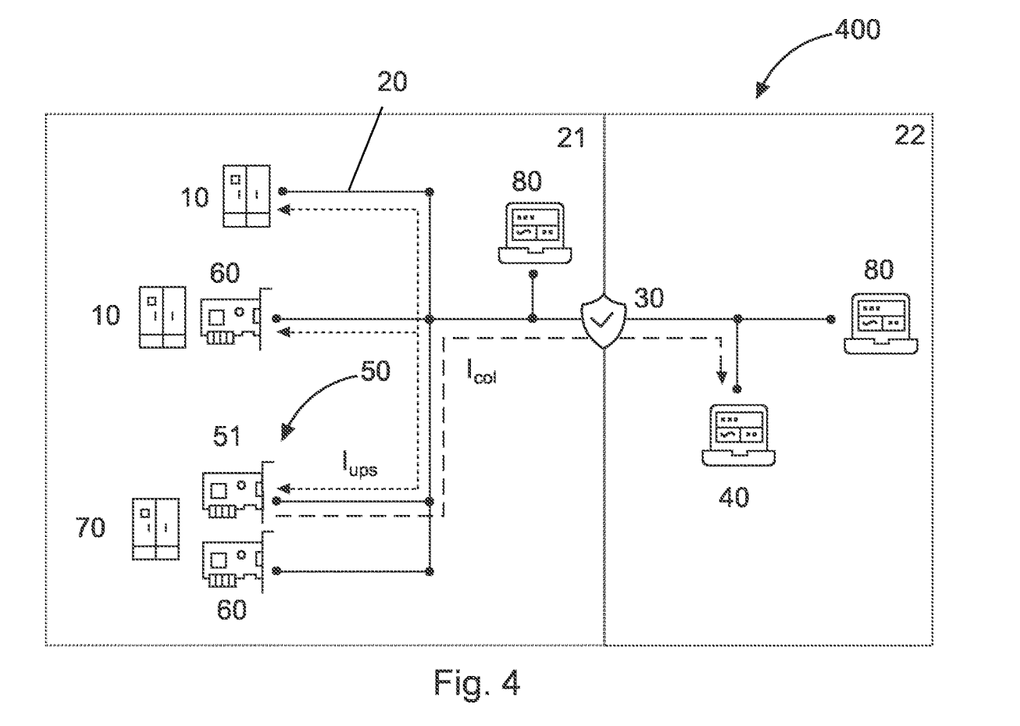
FIG. 4 shows a schematic view of an information communication system according to a fourth embodiment.

FIG. 4 shows a schematic view of an information communication system 400 according to a fourth embodiment. Compared to the information communication system 100 of FIG. 1, the information communication system 400 comprises no information aggregator 50 as a separate device.

Rather, the second UPS 70 comprises an aggregator network adapter 51, in which the functionality of the information aggregator 50 is integrated. Thus, the aggregator network adapter 51 provides a plug-in solution for an information aggregator 50 that can be plugged into an existing second UPS 70 in the information communication system 400. This allows an easy upgrade of existing information communication systems.

Figure 5:
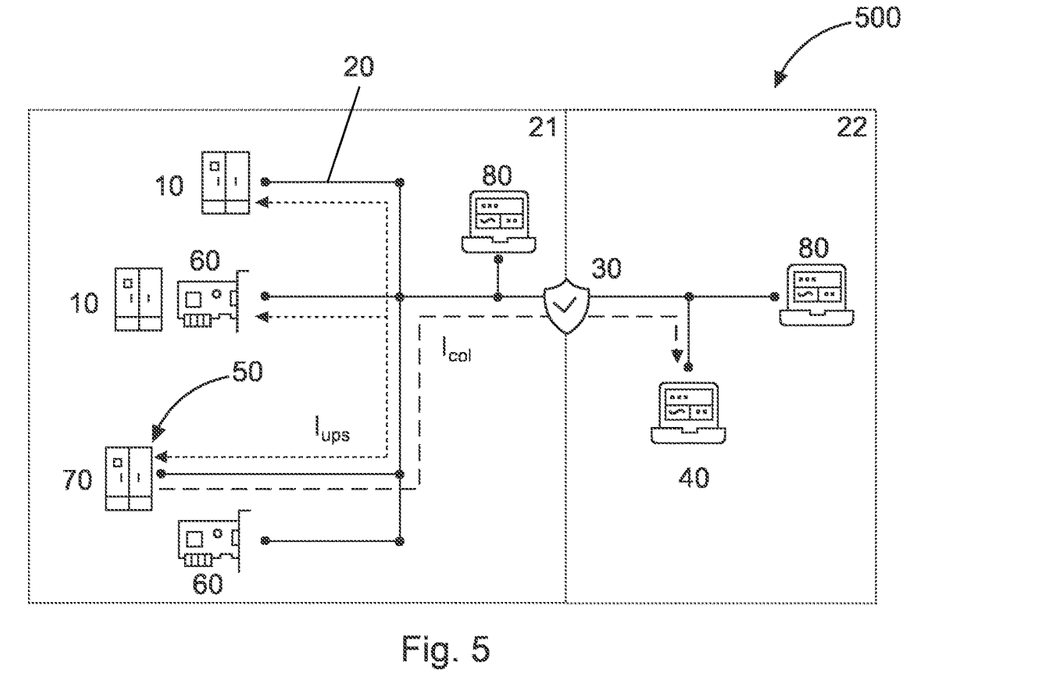
FIG. 5 shows a schematic view of an information communication system according to a fifth embodiment.

FIG. 5 shows a schematic view of an information communication system 500 according to a fifth embodiment. Like the information communication system 400 of FIG. 4, the information communication system 500 comprises no information aggregator 50 as a separate device.

Rather, the information aggregator 50 is integrated into the second UPS 70. Consequently, an information communication system can be upgraded with supplying a new second UPS 70 of this kind.

Figure 6:
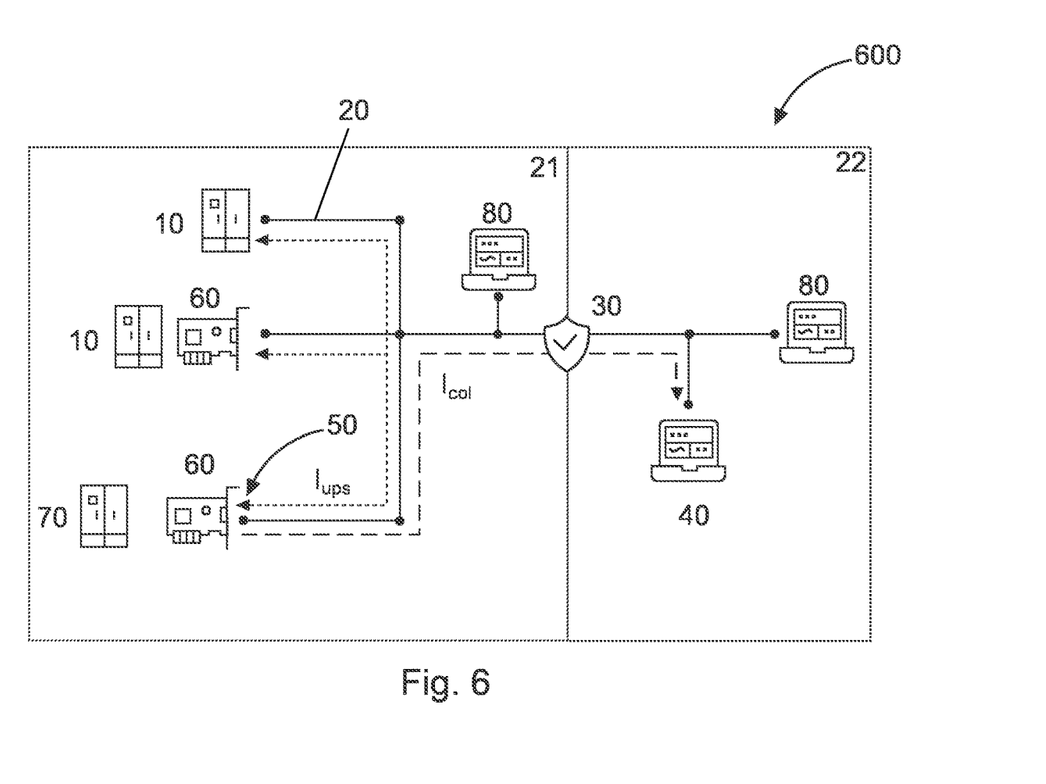
FIG. 6 shows a schematic view of an information communication system according to a sixth embodiment.

FIG. 6 shows a schematic view of an information communication system 600 according to a sixth embodiment. Like the information communication system 400 of FIG. 4, the information communication system 600 comprises no information aggregator 50 as a separate device.

Rather, the information aggregator 50 is integrated into the UPS network adapter 60. Consequently, an information communication system can be upgraded by switching an existing UPS network adapter 60 with an UPS network adapter 60 with integrated information aggregator 50.

Figure 7:
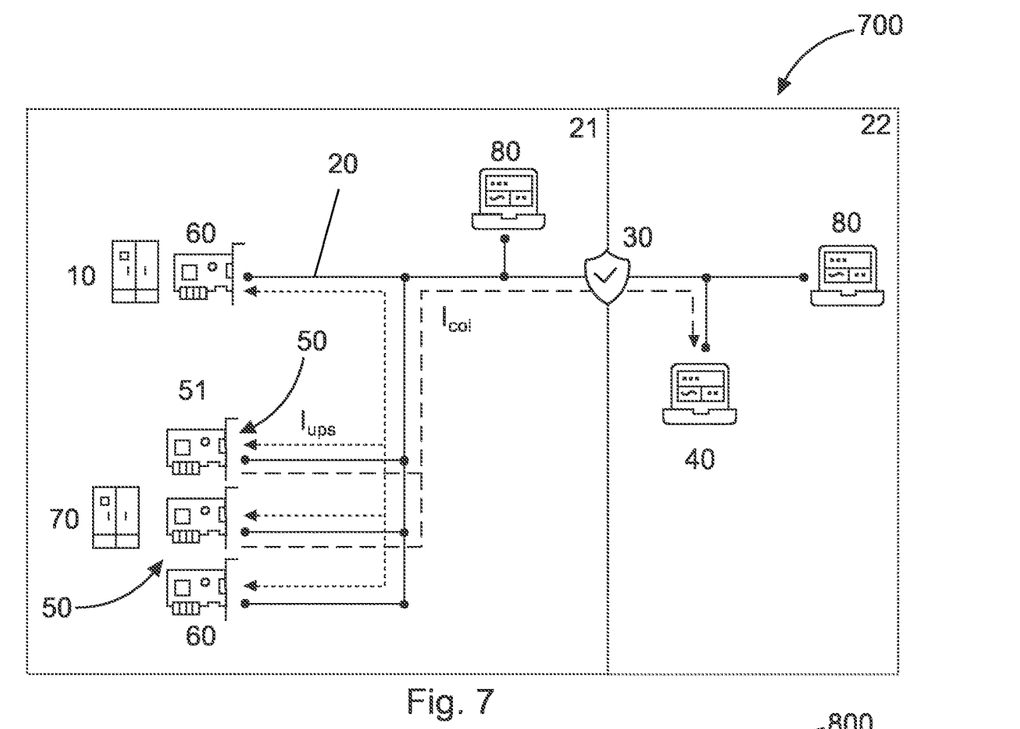
FIG. 7 shows a schematic view of an information communication system according to a seventh embodiment.

FIG. 7 shows a schematic view of an information communication system 700 according to a seventh embodiment. Like the information communication system 400 of FIG. 4, the second UPS 70 comprises an aggregator network adapter 51, in which the functionality of the information aggregator 50 is integrated.

In this case, the second UPS 70 comprises two plugged in aggregator network adapters 51. Thus, the aggregator network adapter 51 provides a plug-in solution for an information aggregator 50 that can be plugged into an existing second UPS 70 in the information communication system 700. This allows an easy upgrade of existing information communication systems with a plurality of information aggregators 50.

Figure 8:
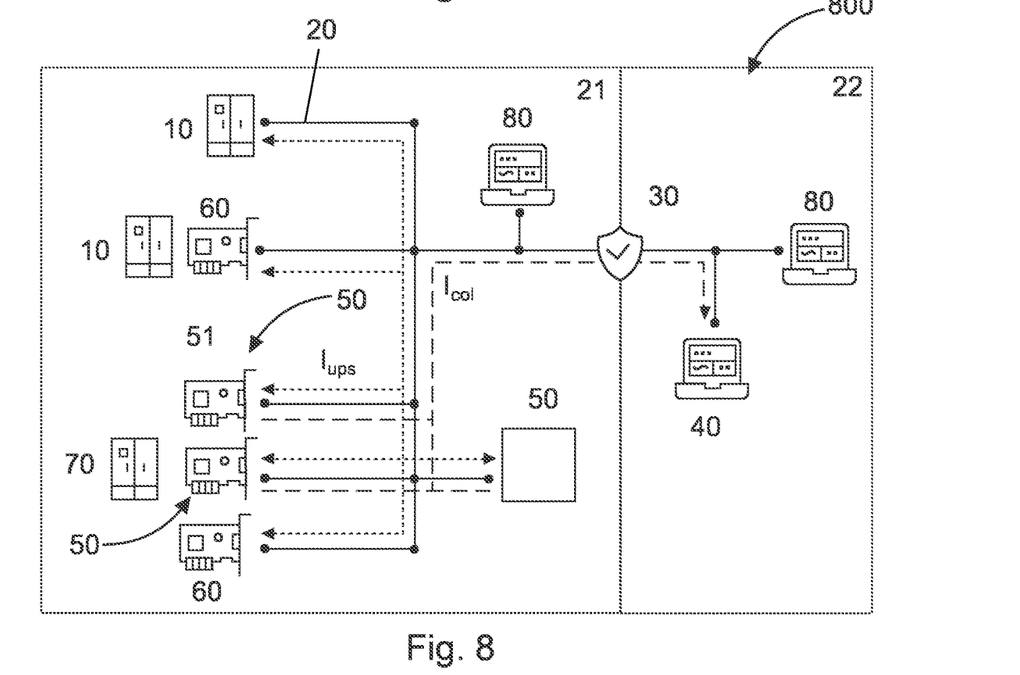
FIG. 8 shows a schematic view of an information communication system according to an eighth embodiment.

FIG. 8 shows a schematic view of an information communication system 800 according to an eighth embodiment. The information communication system 800 is basically a combination of the information communication system 400 of FIG. 4 and the information communication system 100 of FIG. 1.

In other words, the information communication system 800 of FIG. 8 comprises an information aggregator 50 as a separate device and two aggregator network adapters 51 that are plugged into the second UPS 70. This embodiment should illustrate that different implementations of the information aggregator can be combined to allow a flexible design of an information communication system.

Figure 9:
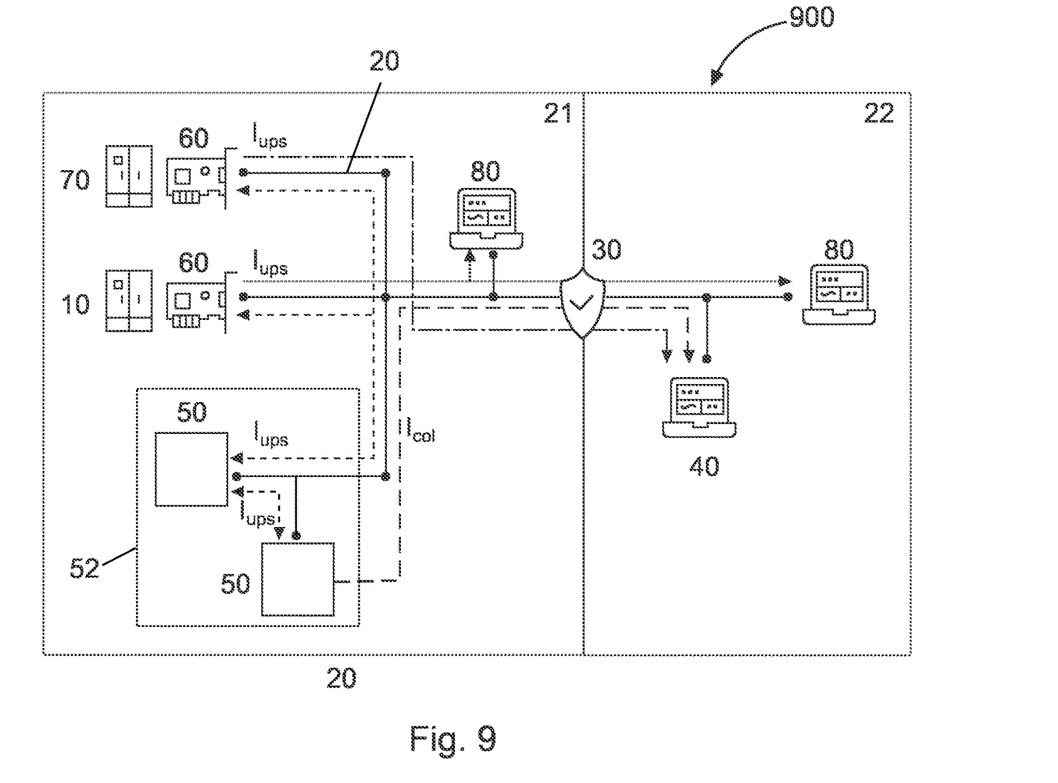
FIG. 9 shows a schematic view of an information communication system according to a ninth embodiment.

FIG. 9 shows a schematic view of an information communication system 900 according to a ninth embodiment. The information communication system 900 comprises a plurality of information aggregators 50. The plurality of information aggregators 50 form a hierarchical information polling stack 51, wherein one information aggregator 50 polls the UPS information $I_{ups}$ from the first UPS 10 and provides the UPS information $I_{ups}$ to the other information aggregator 50. This information aggregator 50 is configured to determine the collector information Icol based on the provided UPS information $I_{ups}$ and to send the collector information Icol to the second information collector 40.

The hierarchical information polling stack 52 for example comprises a plurality of information aggregators 50 polling UPS information $I_{ups}$ from the UPSs, wherein the hierarchical information polling stack 52 comprises another information aggregator 50 that is provided by the aforementioned plurality of information aggregators 50 with the UPS information $I_{ups}$.

Furthermore, the information polling stack 52 might comprise a plurality of information aggregators 50. At least one of the plurality of information aggregators 50 polls UPS information $I_{ups}$ from the UPSs and provides the UPS information to other information aggregators 50. At least one of the plurality of information aggregators 50 is provided with the UPS information $I_{ups}$ by other information aggregators 50 and is configured to provide the UPS information $I_{ups}$ to other information aggregators 50. At least one of the plurality of information aggregators 50 is provided with the UPS information $I_{ups}$ by other information aggregators 50 and is configured to determine the collector information $I_{col}$ based on the provided UPS information $I_{ups}$ and to send the collector information $I_{col}$ to the second information collector 40. In other words, the hierarchical information polling stack 52 comprises a simple serial arrangement of information aggregators 50 as well as a plurality of hierarchical layers of information aggregators 50. Furthermore, each information aggregator 50 of the hierarchical information polling stack 52 may be configured to determine the collector information $I_{col}$. Consequently, the following information aggregators 50 might be configured to provide the collector information $I_{col}$ to other information aggregators 50 of the hierarchical information polling stack 52.

Figure 10:
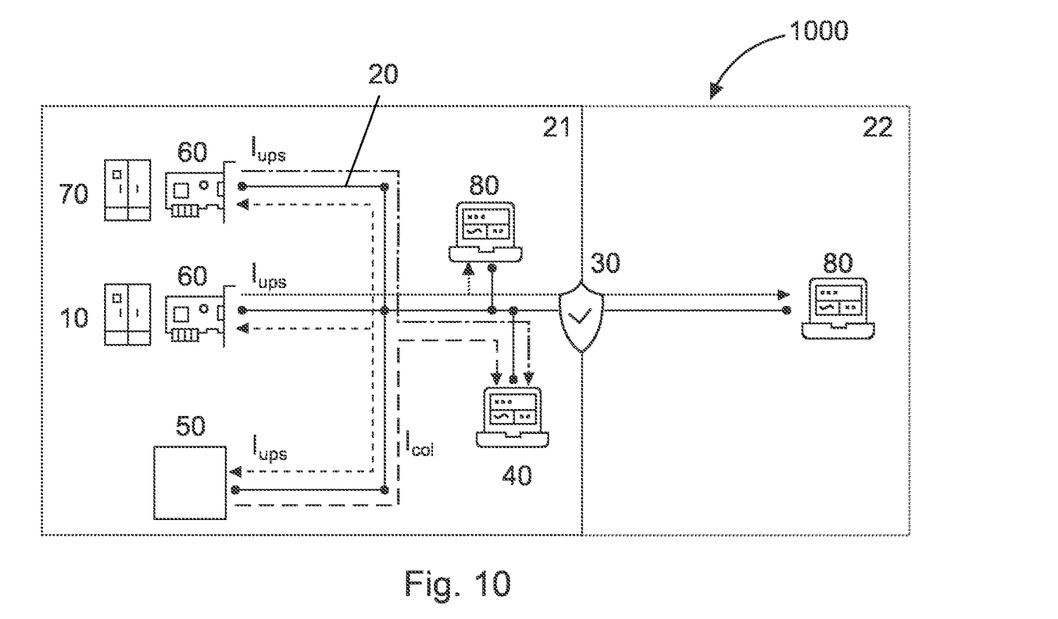
FIG. 10 shows a schematic view of an information communication system according to a tenth embodiment.

FIG. 10 shows a schematic view of an information communication system 1000 according to a tenth embodiment. Compared to the information communication system 100 of FIG. 1, the information communication system 1000 comprises a second information collector 40 that disposed in the LAN 21.

Preferably, the system comprises at least one information collector, wherein the at least one information collector is configured to read and process the UPS information.

Preferably, the communication network comprises a plurality of sub-networks. Further preferably, the information aggregators are connected to a first sub-network, wherein the UPSs and further preferably the information collectors are connected to a second sub-network. The first sub-network is connected to the second sub-network, in particular via a gateway, further particular a data diode gateway.

Preferably, the information aggregator comprises two, in particular physical, connectors, which are both connected to the communication network. The first connector only allows information into the information aggregator. The second connector only allows information out of the information aggregator. Furthermore, between the first connector and the second connector the information aggregator comprises a firewall.

Preferably, the information aggregator comprises two input connectors. A first input connector is connected to the communication network and a second input connector is connected to at least one UPS that is not connected to the communication network.

Preferably, the information aggregator comprises two input connectors. A first input connector is connected to a first communication network and a second input connector is connected to a second communication network, each of the first and second communication network comprising a UPS. The information aggregator is further preferably configured to poll UPS information from UPSs of the first communication network and/or the second communication network, determine collector information using the polled UPS information and send the collector information to the information collector.

Thus, the information aggregator allows the information collector to collect and process UPS information of the UPS, or in other words status information about the UPS.

Preferably, the communication network comprises a local area network, LAN. and/or a wide area network, WAN.

A LAN is a collection of devices connected together in one physical location, such as a building, office, or home. A LAN can be small or large, ranging from a home network with one user to an enterprise network with thousands of users and devices in an office.

A WAN is a large network of information that is not tied to a single location. WAN are a form of telecommunication networks that can connect devices from multiple locations and across the globe.

The information collector is thus enabled to monitor existing UPSs on the communication network at site and sell services like cloud monitoring subscription and 24/7 service to third parties. For example, UPS information from other branded UPS can be gathered. Also, competitor specific UPS and their specific related information can be evaluated.

Preferably, the information collector comprises cloud devices.

Furthermore, comparing all different UPS, in particular different UPS brands, allows for an improved big information analysis, wherein UPS information about behaviours of different brand UPS is collected in the same location (customer fleet analysis, or regional analysis, UPS model comparison, UPS Load profiling, etc).

Consequently, a customer has access to a unique cloud platform, where all UPS or other network connected products are monitored and displayed together, independently from the ability of directly access of the information collector. The customer can receive notification alerts in a unique and standardized format for all different kind of UPSs, in particular brands, and UPS models in the fleet.

In a preferred embodiment, the information aggregator is configured to generate collector information from the polled UPS information to be at least partly accessible by the information collector.

Preferably, the information aggregator is configured to determine the collector information by converting the polled UPS information. Converting comprises bringing the polled UPS information into a UPS information format that can be processed by the information collector.

Preferably, converting the polled UPS information might comprise filtering the polled UPS information. In other words, the information aggregator might not use all of the polled UPS information in the conversion, as for example the UPS information format might be slimmer than a UPS information format that can be read by the information collector.

In a preferred embodiment, the Information communication system comprises a plurality of information aggregators.

Preferably, the plurality of information aggregators is configured to provide redundancy functions. In other words, the plurality of information aggregators poll UPS information from the same UPS to provide redundant polled UPS information.

Preferably, the plurality of information aggregators is configured to provide balancing functions. In other words, the plurality of information aggregators shares the polling function so that not each information aggregator has to poll UPS information from each of the UPSs.

Preferably, an information aggregator of the communication network can share collector information with an information collector not accessible by another information aggregator.

In a preferred embodiment, the plurality of information aggregators builds a hierarchical information polling stack, wherein at least one of the plurality of information aggregators polls the UPS information from the plurality of information aggregators.

Preferably, only one of the plurality of information aggregators is configured to communicate with the information collector. In other words, at least one information aggregator of the plurality of information aggregators only provides UPS information and/or collector information to the one information aggregator that is configured to communicate with the information collector.

In a preferred embodiment, the information aggregator is integrated into the UPS.

In other words, the UPS comprises a UPS controller with information aggregation functionality.

Preferably, the information aggregator is integrated into a UPS that is connected to the communication network and that is directly accessible by the information aggregator. Thus, the information aggregation functionality can be provided in the communication network without adding an additional device to the communication network.

In a preferred embodiment, the UPS comprises a UPS network adapter. The UPS network adapter is configured to connect the UPS to the communication network. The information aggregator is integrated into the UPS network adapter.

In a preferred embodiment, the UPS comprises an aggregator network adapter. The aggregator network adapter is configured to be plugged into the UPS. The information aggregator is integrated into the aggregator network adapter.

In a preferred embodiment, the UPS is directly connected to the information collector. The UPS is configured to directly provide the UPS information to the information collector when the information aggregator initiates polling the UPS information from the UPS.

For example, if no conversion of the UPS information is necessary for the information collector to read and process the UPS information, the UPS can directly send the UPS information to the information collector, when the information aggregator requests polling the UPS information from the UPS.

In a preferred embodiment, the information communication system comprises an information collector interface, wherein the information collector interface is configured to exchange information with the information collector. The information aggregator is configured to send the collector information to the information collector through the information collector interface.

Preferably, the information collector interface comprises a network security system, further preferably connecting a LAN and a WAN, wherein the UPS is connected to the LAN and the information collector is preferably connected to the WAN. The network security system comprises of both hardware and software to secure the underlying networking infrastructure from unauthorized alteration, malfunction, misapplication, and inappropriate disclosure. This provides a secure platform for devices connected to the communication network and for the users to perform their respective functions within a secure environment.

In a preferred embodiment, the information aggregator comprises a cache memory, wherein the information aggregator is configured to store the UPS information and/or the collector information in the cache memory.

In a preferred embodiment, the information aggregator is provided with a specific polling protocol; wherein the information aggregator is configured to execute the specific polling protocol to poll the UPS information from the UPS.

Preferably, the specific polling protocol comprises specific and/or unique information that allow the information aggregator to poll the UPS information.

Preferably, the information aggregator can identify connected devices and usable communication protocols (automatic recognition). Identified devices and corresponding protocols, together with additional information are stored into its internal configuration.

The specific polling protocol is a predetermined protocol that has been developed specifically for polling UPS information from the UPS.

The information aggregator preferably is provided with different protocols or unique information for connecting to all kind of UPSs In a preferred embodiment, the UPS information comprises status information about the UPS.

Preferably, the status information comprises a status of an alarm.

In a preferred embodiment, the UPS supports the RFC 1628 protocol.

In a preferred embodiment, the information aggregator uses a simple network monitoring protocol, SNMP, to poll the UPS information from the UPS.

According to an aspect of the invention, an information communication method for an information aggregator of an information communication system, as described herein, comprises the steps: Polling UPS information from the UPS. Generating collector information using the polled UPS information. Sending the collector information to the information collector.

According to the present disclosure, also a computer program is presented, wherein the computer program comprises instructions to cause the at least one information aggregator as defined in the independent claims to execute any one of the step of the method according to the present invention when the computer program is run on the information processing system.

According to the present disclosure, also a computer-readable medium is presented, wherein the computer-readable medium stores the computer program as defined.

LIST OF REFERENCE SYMBOLS 10 first UPS
20 communication network
21 LAN
22 WAN
30 information collector interface
40 second information collector
50 information aggregator
51 aggregator network adapter
52 hierarchical information polling stack
60 UPS network adapter
70 second UPS
80 first information collector
100-1000 information communication system
Icol collector information
Iups UPS information All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An information communication system, comprising:
a communication network, configured to exchange uninterruptable power supply, UPS, information;
a UPS, connected to the communication network, wherein the UPS is configured to exchange UPS information to the communication network;
an information collector, wherein the information collector is configured to collect and process the UPS information;
wherein the information collector has no direct access to the UPS information by not knowing how to poll the UPS and/or not being able to interpret the UPS information;
wherein the information communication system comprises an information aggregator provided with a plurality of specific polling protocols, that is connected to the communication network and is configured:
to poll the UPS information from the UPS by executing a specific polling protocol from among the plurality for polling UPS information from the UPS;

to generate collector information using the polled UPS information; and to send the collector information to the information collector.

2. The information communication system of claim 1, wherein the information aggregator is configured to generate collector information from the polled UPS information to be at least partly accessible by the information collector.

3. The information communication system of claim 1, further comprising a plurality of information aggregators.

4. The information communication system of claim 1, wherein the information aggregator is integrated into the UPS.

5. The information communication system of claim 1, wherein the UPS comprises a UPS network adapter; wherein the UPS network adapter is configured to connect the UPS to the communication network; and wherein the information aggregator is integrated into the UPS network adapter.

6. The information communication system of claim 1, wherein the UPS comprises an aggregator network adapter; wherein the aggregator network adapter is configured to be plugged into the UPS; and wherein the information aggregator is integrated into the aggregator network adapter.

7. The information communication system of claim 1, wherein the UPS is directly connected to the information collector; and wherein the UPS is configured to directly provide the UPS information to the information collector when the information aggregator initiates polling the UPS information from the UPS.

8. The information communication system of claim 1, further comprising:

an information collector interface configured to exchange information with the information collector;

wherein the information aggregator is configured to send the collector information to the information collector through the information collector interface.

9. The information communication system of claim 1, wherein the information aggregator comprises a cache memory, and wherein the information aggregator is configured to store the UPS information and/or the collector information in the cache memory.

10. The information communication system of claim 1, wherein the UPS information comprises status information about the UPS.

11. The information communication system of claim 1, wherein the UPS supports the RFC 1628 protocol.

12. The information communication system of claim 1, wherein the information aggregator uses a simple network monitoring protocol, SNMP, to poll the UPS information from the UPS.

13. The information communication system of claim 3, wherein the plurality of information aggregators builds a hierarchical information polling stack, wherein at least one of the plurality of information aggregators polls the UPS information from the plurality of information aggregators.

* * * * *